(12) United States Patent
Li et al.

(10) Patent No.: US 6,378,832 B1
(45) Date of Patent: Apr. 30, 2002

(54) ISOLATION MOUNTING FOR A CANTILEVERED LOAD

(75) Inventors: Wen L. Li, Fayetteville; Sohail Ahmed, Baldwinsville; Shau-Tak R. Chou, Fayetteville, all of NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/409,886

(22) Filed: Oct. 1, 1999

(51) Int. Cl.[7] .............................. F16M 1/00; F16F 7/00
(52) U.S. Cl. ...................... 248/637; 248/638; 248/635; 267/141; 267/141.5
(58) Field of Search .................. 248/635, 638, 248/675; 180/299, 312; 267/141, 141.2; 417/313, 363

(56) References Cited

U.S. PATENT DOCUMENTS

| | | | | |
|---|---|---|---|---|
| 1,876,640 A | * | 9/1932 | Dobson ...................... 248/635 |
| 2,729,846 A | * | 1/1956 | Reed ............................ 16/109 |
| 2,903,208 A | * | 9/1959 | Everitt ..................... 267/141.2 |
| 3,114,060 A | * | 12/1963 | Goettl .......................... 310/51 |
| 3,385,542 A | * | 5/1968 | Enemark et al. ............. 248/637 |
| 3,441,203 A | * | 4/1969 | Larsen et al. ................ 417/363 |
| 3,830,595 A | * | 8/1974 | Carpenter et al. ........... 417/363 |
| 4,076,197 A | * | 2/1978 | Dochterman ................ 248/604 |
| 4,676,473 A | * | 6/1987 | Giles ............................ 248/638 |
| 4,683,520 A | * | 7/1987 | Grassens et al. ............. 361/427 |
| 4,713,714 A | * | 12/1987 | Gatti et al. ................... 360/137 |
| 5,030,068 A | * | 7/1991 | Jacobs et al. ................ 417/363 |
| 5,295,653 A | * | 3/1994 | Miyazaki et al. ............ 248/675 |
| 5,435,516 A | * | 7/1995 | Ogasawara et al. .......... 248/635 |
| 5,449,153 A | * | 9/1995 | Catalano et al. .......... 267/141.4 |
| 5,697,678 A | * | 12/1997 | Huber ...................... 303/116.4 |
| 5,718,407 A | * | 2/1998 | Lee ............................. 248/634 |
| 5,810,322 A | * | 9/1998 | Zhao et al. .................. 248/675 |
| 6,132,138 A | * | 10/2000 | Li et al. ...................... 417/363 |
| 6,145,821 A | * | 11/2000 | Suzuki et al. ........... 267/140.12 |
| 6,296,236 B1 | | 10/2001 | Ott .......................... 267/140.11 |

FOREIGN PATENT DOCUMENTS

| | | | |
|---|---|---|---|
| JP | 59-200835 | * | 11/1984 |
| JP | 6-137379 | * | 5/1994 |
| JP | 6-200979 | * | 7/1994 |

* cited by examiner

Primary Examiner—Anita King
Assistant Examiner—Naschicha S. Morrison

(57) ABSTRACT

Isolation mountings extend in a common plane and the axis of the overhung or cantilevered load is perpendicular to that plane. The isolation mountings are located in recesses formed in the base plate alone or in both the base plate and mounting plate. Where the recesses are solely located in the base plate, installation may simply be placing a washered or large headed screw serially through the isolator, the base plate and threading the screw into the mounting plate or motor shell which remains separated from the base plate. This will be repeated for each isolator. If recesses are located in both the base plate and mounting plate or motor shell, installation simply requires placing the two bottom isolation mountings into the corresponding recesses in the base plate and mounting plate or motor shell. Then where there are upper recesses in the base plate and mounting plate or motor shell, an isolation mounting is placed in one of the recesses and compressed while the recesses and isolation mounting are moved into register. It should be noted that the other isolation mountings, being in the same plane and opposite thereto, will also tend to be compressed as the upper isolation mounting is compressed. The compression of the isolation mounting can be performed by any suitable means such as through the use of a tool which acts as a ramp or sloped surface for compressing the upper isolation mounting. When the upper isolation mounting passes the end of the ramp it is received in the other recess with at least a partial reduction of the compression of the isolation mountings in the installed position.

20 Claims, 12 Drawing Sheets

ISOLATION MOUNTING FOR A CANTILEVERED LOAD

BACKGROUND OF THE INVENTION

Motors are commonly operated with their shafts oriented horizontally. Additionally, a motor may be mounted in a cantilevered fashion as where the motor is driving a fan and the fan impeller and motor are on opposite sides of a supporting partition such as the cap of the fan scroll. Because, when used, isolation mounting structure located beneath the motor supports the weight of the motor, or the like, their use has required complicated configurations of the isolation mountings and hard to assemble arrangements. For example, isolation mountings commonly have a lip portion and a neck portion with the lip portion requiring its deformation to be inserted into an opening which receives the neck portion, a portion of reduced thickness.

Motors mounted with their shafts oriented vertically may be considered to be mounted in a cantilevered fashion where a major portion of the motor is unsupported from the sides and would overhang relative to the support structure if the shaft is oriented horizontally. A major difference in the motors mounted with their shafts vertically oriented and those with their shafts extending upwardly from the motor is that, when a motor is vertically oriented, the weight is supported by all of the mounting structure and the loading direction is shifted 90°.

SUMMARY OF THE INVENTION

A load is supported by isolation mounting structure located in a plane generally perpendicular to the plane of the load. The load is overhung or cantilevered with respect to the plane of the isolation mounting structure. The load, such as a motor, is secured to a mounting plate/motor mount which is connected to base plate/cap of a fan scroll through the isolation mounting structure.

Upon assembly of a vertically extending load, the steps of assembly, other than orientation, would be the same as in the case of a horizontally extending load. The difference is that, in the case of a horizontal load, only the isolation mounting above or beneath the load supports it and tends to provide a pivot for the turning moment resulting from the load. The other mounting structure only resists the turning moment. In the case of a vertical load, all of the supports resist the weight of the load which tends to act along the axis of the shaft in the case of a motor, or the like and this is shifted 90°, as compared to a horizontally extending load.

Assuming cylindrical or annular supports, only, the lower or upper ones tend to be axially compressed by a horizontal load and all of the supports are compressed, in what would be a lateral direction for a horizontal load, in the case of a vertical load.

The securing of the mounting plate to the base plate does not require the use of separate fasteners, such as nuts, but they may be used in some embodiments of the present invention to prevent separation of the members and/or to regulate the bias/compression applied to the isolation mountings. Portions of the base plate have recesses, or the like, for receiving the isolation mountings. Alternatively, recesses may be located in both the base plate and the mounting plate.

It is an object of this invention to facilitate assembly of structures having loads which are cantilevered or otherwise supported at or near only one end and employing isolation mountings.

It is another object of this invention to permit the use of simple isolators. These objects, and others as will become apparent hereinafter, are accomplished by the present invention.

Basically, isolation mountings extend in a common plane and the axis of the overhung or cantilevered load is perpendicular to that plane. The isolation mountings are located in recesses formed in the base plate alone, in both the base plate and mounting plate, or in both the base plate and motor housing. Where the recesses are solely located in the base plate, installation may simply be placing a washered or large headed screw serially through the isolator, the base plate and threading the screw into the mounting plate or motor housing which remains separated from the base plate. This will be repeated for each isolator. If recesses are located in both the base plate and mounting plate or motor housing, installation simply requires placing the two bottom isolation mountings into the corresponding recesses in the base plate and mounting plate or motor housing. Then, where there are upper recesses in the base plate and mounting plate, an isolation mounting is placed in one of the recesses and compressed while the recesses and isolation mounting are moved into register. It should be noted that the other isolation mountings, being in the same plane and opposite thereto, will also tend to be compressed as the upper isolation mounting is compressed. The compression of the isolation mounting can be performed by any suitable means such as through the use of a tool which acts as a ramp or sloped surface for compressing the upper isolation mounting. When the upper isolation mounting passes the end of the ramp it is received in the other recess with at least a partial reduction of the compression of the isolation mountings in the installed position.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE RELATED ART

Figure 1:
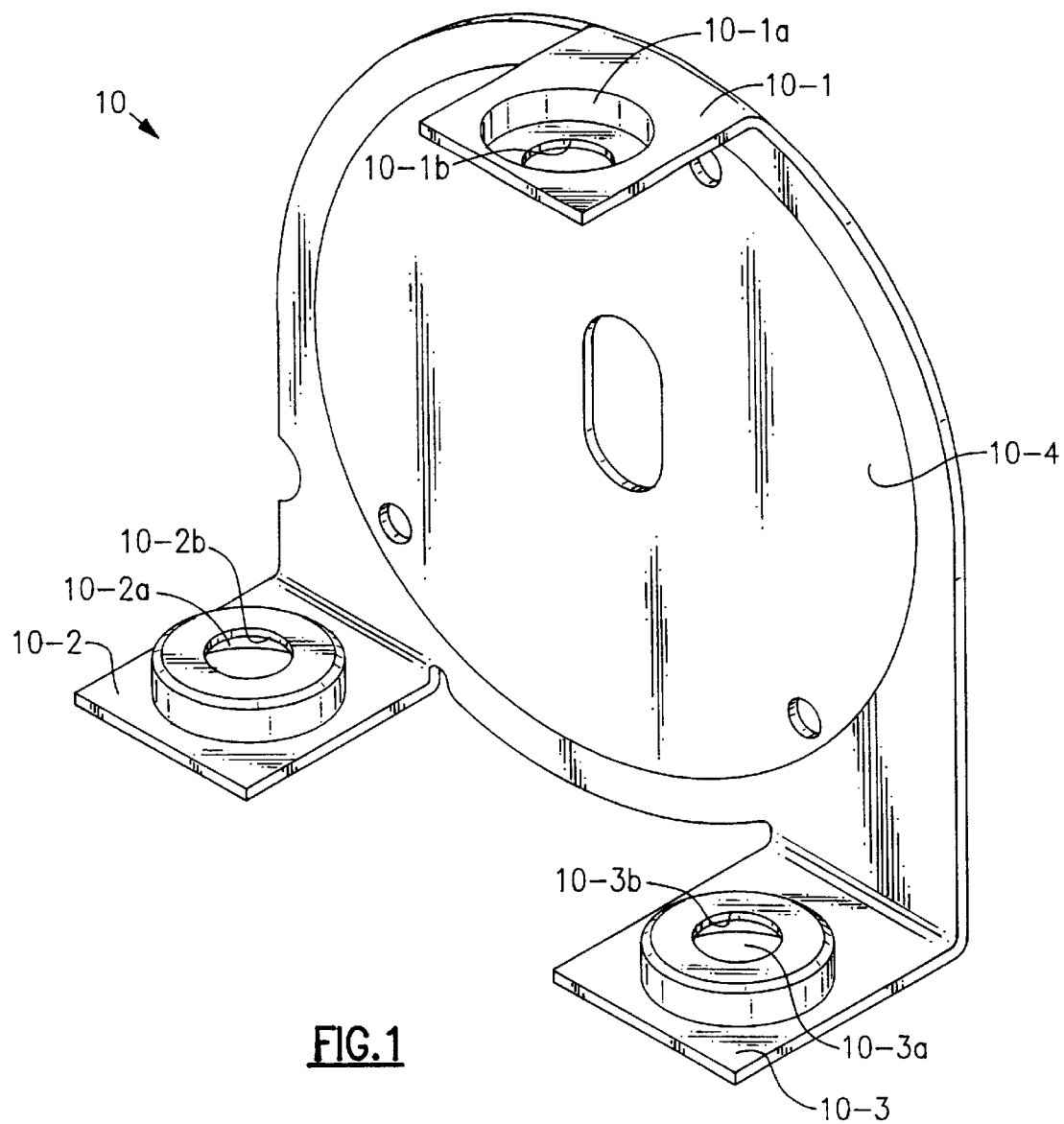
FIG. 1 is a pictorial view of the base plate.

Referring to FIG. 1, the base plate 10, in the preferred embodiment for mounting a motor generally corresponds to a circular disk with a plurality of arms, with three being illustrated. Arms 10-1, 10-2, and 10-3 are bent such that arms 10-2 and 10-3 are circumferentially spaced from each other and arm 10-1 and are located in the same plane and arm 10-1 is spaced therefrom and in a parallel plane. Alternatively, arms 10-1, 10-2 and 10-3 can be in different planes and circumferentially spaced about the circular disk portion. This would permit a more uniform spacing, such as 120° apart where there are three arms. The remaining portion 10-4 of the base plate 10 is of a generally circular shape with notches, cutouts and holes, as required, for assembly to another member. Arm 10-1 has an inwardly extending recess 10-1a formed therein and a hole 10-1b formed in the bottom of the recess 10-1a. Arms 10-2 and 10-3 have inwardly extending recesses 10-2a and 10-3a, respectively, formed therein with holes 10-2b and 10-3b, respectively, formed in the bottoms of the recesses. In the position of use, portion 10-4 can be either vertically or horizontally oriented. If portion 10-4 is vertically oriented, arm 10-1 could be located above or below but horizontal and parallel to the plane defined by arms 10-2 and 10-3. Preferably, arm 10-1 defines the apex of an isosceles triangle defined by arms 10-1 and 10-2 and 10-3.

Figure 2:
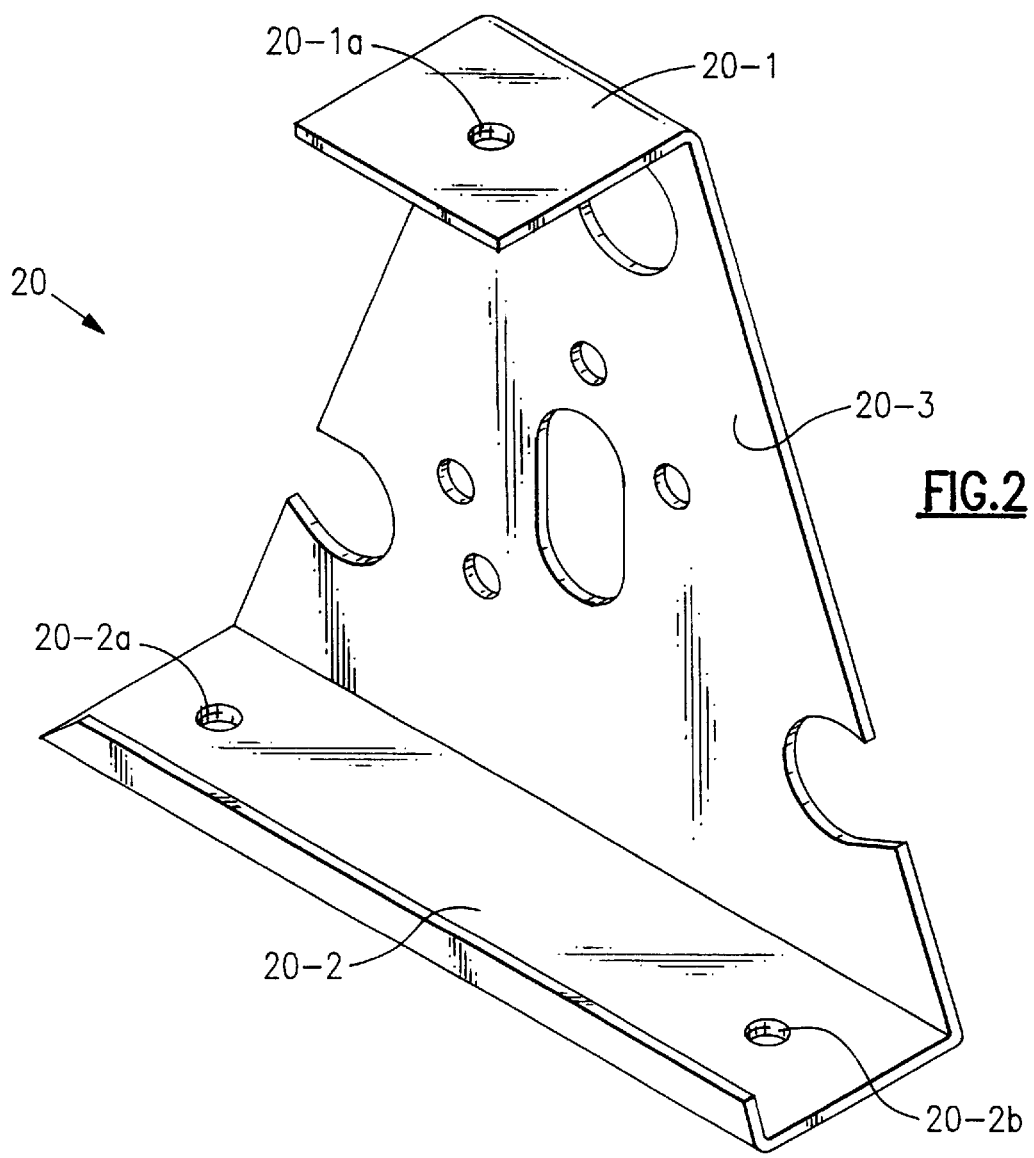
FIG. 2 is a pictorial view of the mounting plate.

Referring to FIG. 2, the numeral 20 generally designates the mounting plate. Mounting plate 20 is secured to base plate 10 and the motor, or the like, is secured to mounting plate 20. Normally the motor will be attached to mounting plate 20 prior to mounting plate 20 being secured to base plate 10. In the preferred configuration for mounting a motor, plate 20 generally corresponds to a triangular piece of metal with a bend along one side, or base, of the triangle and with another bend at the spaced apex. If, as noted above, arms 10-1, 10-2 and 10-3 are in different planes, portion 20-2 would have to be divided into a plurality of portions and bent into planes parallel to planes corresponding to those defined by arms 10-2 and 10-3. The portion 20-1 corresponding to the bent apex portion and the portion 20-2 corresponding to the bent base portion are in spaced, parallel planes. The parallel planes defined by portions 20-1 and 20-2 are closer than the parallel planes defined by arm 10-1 and arms 10-2 and 10-3. The remaining portion, 20-3, of mounting plate 20 is of a trapezoid shape with cutouts and holes, as required, for assembly of another member, such as a motor, thereto. Threaded holes 20-1a, 20-2a and 20-2b are provided in portions 20-1 and 20-2 so as to be, nominally, coaxial with holes 10-1b, 10-2b and 10-3b, respectively. Alternatively, nuts or other suitable members may be welded or otherwise suitably secured to portions 20-1 and 20-2 in place of, or in addition to, threading holes 20-1a, 20-2a and 20-2b.

Figure 3:
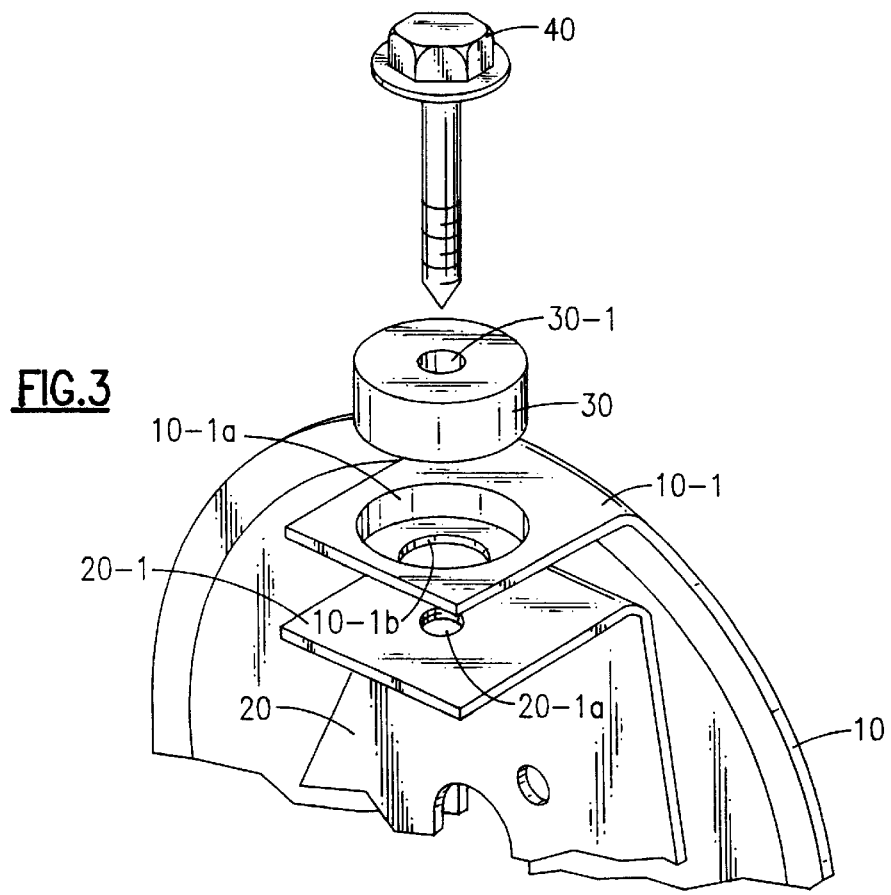
FIG. 3 is an exploded view of the upper isolation mounting structure.

Isolation mountings 30 are annular cylinders of a suitable resilient material such as neoprene or rubber. The relative orientation of base plate 10 and mounting plate 20, during assembly, can be whatever is convenient. FIG. 3 is specific to arm 10-1 and portion 20-1 but it applies to and is illustrative of the attachment of all of the isolation mountings securing mounting plate 20 to base plate 10. Specifically, isolation mountings 30 will be placed in recesses 10-1a, 10-2a and 10-3a, respectively. Alternatively, isolation mountings 30 may be placed on screws 40 such that the threaded portions of screws 40 extend through bores 30-1. Mounting plate 20, with motor 50 secured thereto, will be located within base plate 10 such that washered or large headed screws 40 will serially pass through bores 30-1 in isolation mountings 30, respective ones of holes 10-1b, 10-2b and 10-3b and threaded into threaded holes 20-1a, 20-2a and 20-2b, respectively. Mounting plate 20, when secured in place as described, will be separated from base plate 10 and screws 40 will only contact a surface of respective isolation mountings 30 and respective ones of threaded holes 20-1a, 20-2a and 20-2b. If desired, the threads of holes 20-1a, 20-2a and 20-2b can be replaced or supplemented by nuts or other suitable structure which may be attached to mounting plate 20 by welding or otherwise suitably located for threaded engagement by the threads of screws 40. The screws 40 will be, nominally, tightened to the same degree and the corresponding isolation mountings 30 will also, nominally, be compressed to the same degree.

Figure 4:
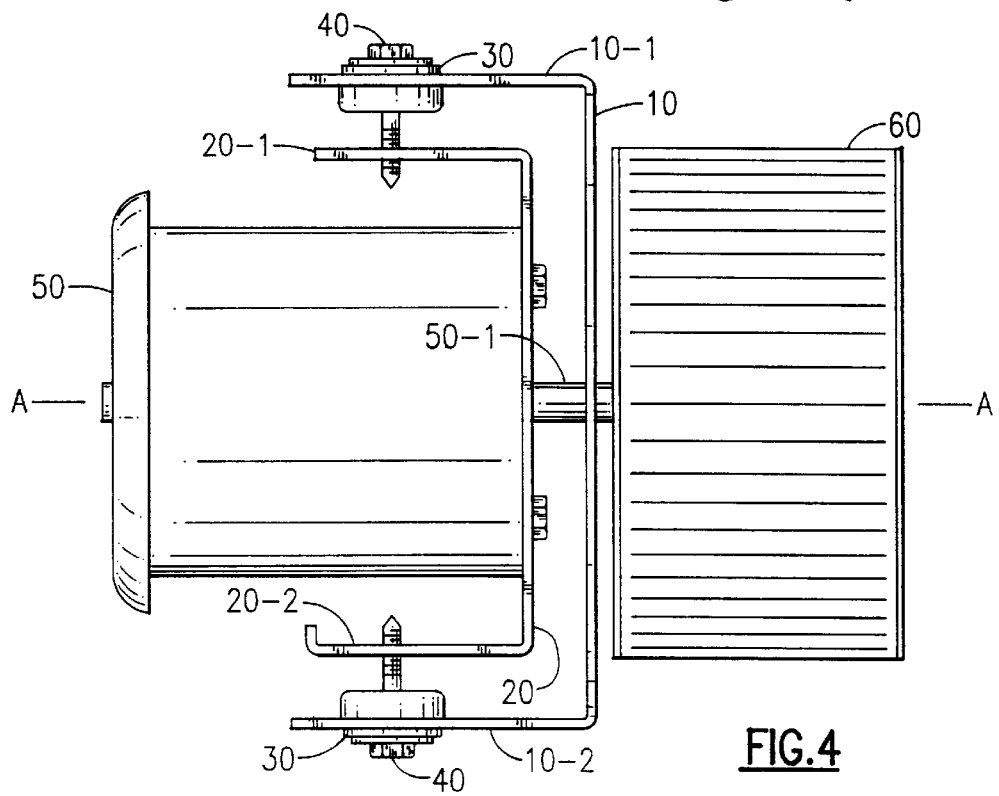
FIG. 4 is a view of a fan and motor mounted according to the teachings of the present invention.

Referring to FIG. 4, motor 50 is shown mounted to mounting plate 20 which is, in turn, secured to base plate 10, which is the cap of a fan scroll, such that the center of gravity of motor 50, or at least a free end of the motor, is cantilevered with respect to the plane defined by the axes of isolation mountings 30 and screws 40. Shaft 50-1 of motor 50 has an axis A—A and extends through suitable openings in portion 20-3 of mounting plate 20 and portion 10-4 of base plate 10. As illustrated, a fan impeller 60 is secured to shaft 50-1 on the opposite side of motor 50 from base plate 10.

If motor 50, shaft 50-1 and impeller 60 are horizontally oriented, as illustrated in FIG. 4, in use, only the top, i.e. above the center of gravity, isolation mountings will be further compressed due to the weight of the motor 50 and impeller 60. The isolation mountings below the center of gravity will tend to be relieved of compressive forces due to the weight of the motor 50 and impeller 60. This is the reverse for normal support structure. However, because the weight of the motor 50 and impeller 60 tends to move mounting plate 20 downward, screws 40 which are rigidly integral therewith are also moved downward. In the case of the upper screw(s) 40, the head or washer tends to move downwardly squeezing the isolation mounting 30 which is rigidly supported by base plate 10. The opposite takes place at the bottom where the head or washer of screw(s) 40 tends to move away from the base plate 10 thereby reducing the compression of the associated isolation mountings 30. Because of this, arm 10-1 may be preferably located below arms 10-2 and 10-3 when motor 50, shaft 50-1 and impeller 60 are horizontally oriented such that two of the isolation mountings 30 will be supporting the weight of motor 50 and impeller 60.

If motor 50, shaft 50-1 and impeller 60 are vertically oriented, in use, all of the isolation mountings 30 will support the weight of motor 50. Specifically, screws 40 will be located in a horizontal plane and will be located in the bores 30-1 of corresponding isolation mountings 30. The screws 40 and thereby mounting plate 20 and motor 50 will be supported by the portions of the respective isolation mountings 30 underlying screws 40.

Although the weight distribution will change depending upon orientation, as explained above, base plate 10 and mounting plate 20 remain separated in all orientations. Screws 40 have metal-to-metal contact with threaded bores 20-1a, 20-2a and 20-2b and any associated fasteners but do not have contact with any other member except for isolation mounting 30. Because all of the isolation mountings 30 support the weight of the motor 50 and impeller 60 in the vertical orientation, the uniform circumferential spacing of arms 10-1, 10-2 and 10-3 may be necessary or desired.

Figure 5:
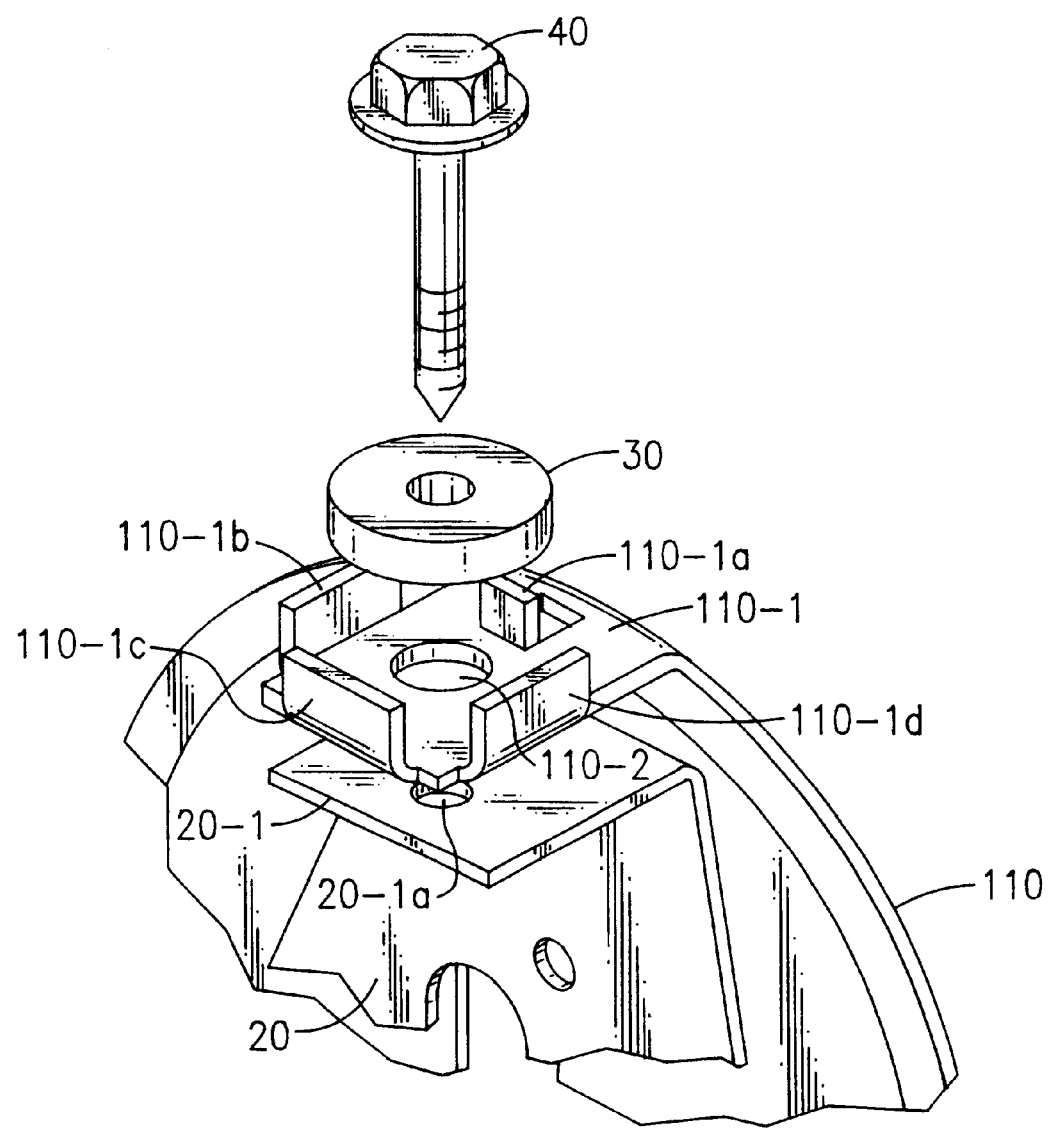
FIG. 5 is an exploded view of a modified upper isolation mounting structure.

FIG. 5 illustrates a modified mounting structure and specifically illustrates the upper mounting structure although the lower mounting structure (not illustrated) will be similarly modified. In the FIG. 5 embodiment, base plate 110 has been modified relative to base plate 10 by replacing inwardly extending recesses 10-1a, 10-2a and 10-3a with a plurality of outwardly extending tabs. Specifically, arm 110-1 has a hole 110-2 for receiving screw 40, with clearance. Tabs 110-1a, 110-1b, 110-1c, and 110-1d are formed in arm 110-1 and bent outwardly so as to collectively form structure for retaining isolation mounting 30 in place in the equivalent manner of recesses 10-1a, 10-2a and 10-3a. The embodiment of FIG. 5 would function like, and otherwise be the same as, the embodiment of FIGS. 1–4.

Figure 6:
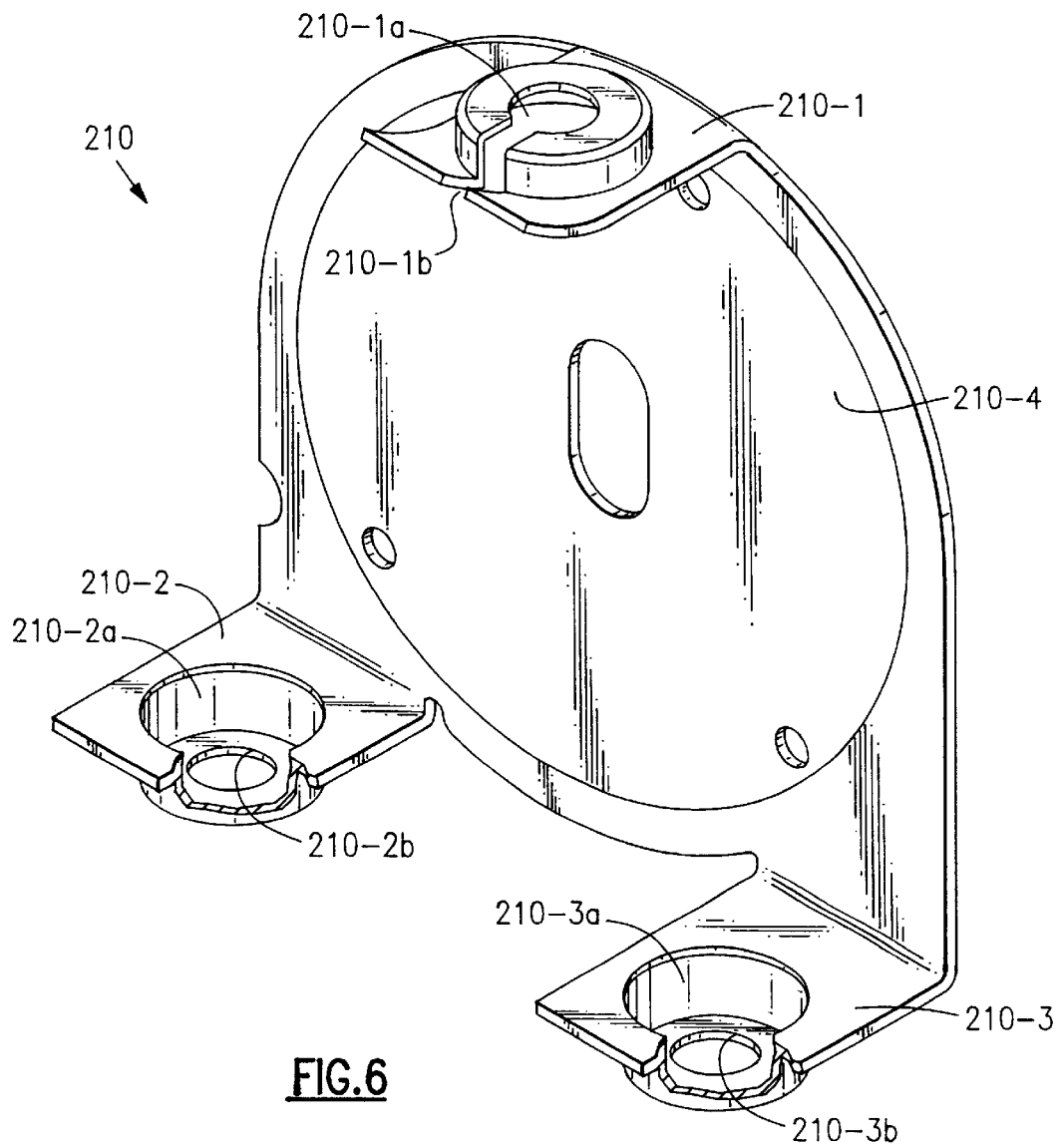
FIG. 6 is a partially cutaway pictorial view of a modified base plate.

Referring to FIG. 6, the plate 210 generally corresponds to a circular disk with a plurality of arms, with three being illustrated. Arms 210-1, 210-2, and 210-3 are bent such that arms 210-2 and 210-3 are circumferentially spaced from each other and arm 210-1 and are located in the same plane and arm 210-1 is spaced therefrom and in a parallel plane. Alternatively, arms 210-1, 210-2 and 210-3 can be in different planes and circumferentially spaced about the circular disk portion. This would permit a more uniform spacing, such as 120° apart where there are three arms. The remaining portion 210-4 of the base plate 210 is of a generally circular shape with notches, cutouts and holes, as required, for assembly to another member. Arm 210-1 has an outwardly extending recess 210-1a formed therein and a slot 210-1b in the side and bottom of the recess 210-1a extending outwardly from portion 210-4. Arms 210-2 and 210-3 have outwardly extending recesses 210-2a and 210-3a, respectively, formed therein with holes 210-b and 210-3b, respectively, formed in the bottom of the recesses. In the position of use, portion 210-4 can be vertically or horizontally oriented. If portion 210-4 is vertically oriented, arm 210-1 would be located above, horizontal, and parallel to the plane defined by arms 210-2 and 210-3. Preferably, arm 210-1 defines the apex of an isosceles triangle defined by arms 210-1 and 210-2 and 210-3.

Figure 7:
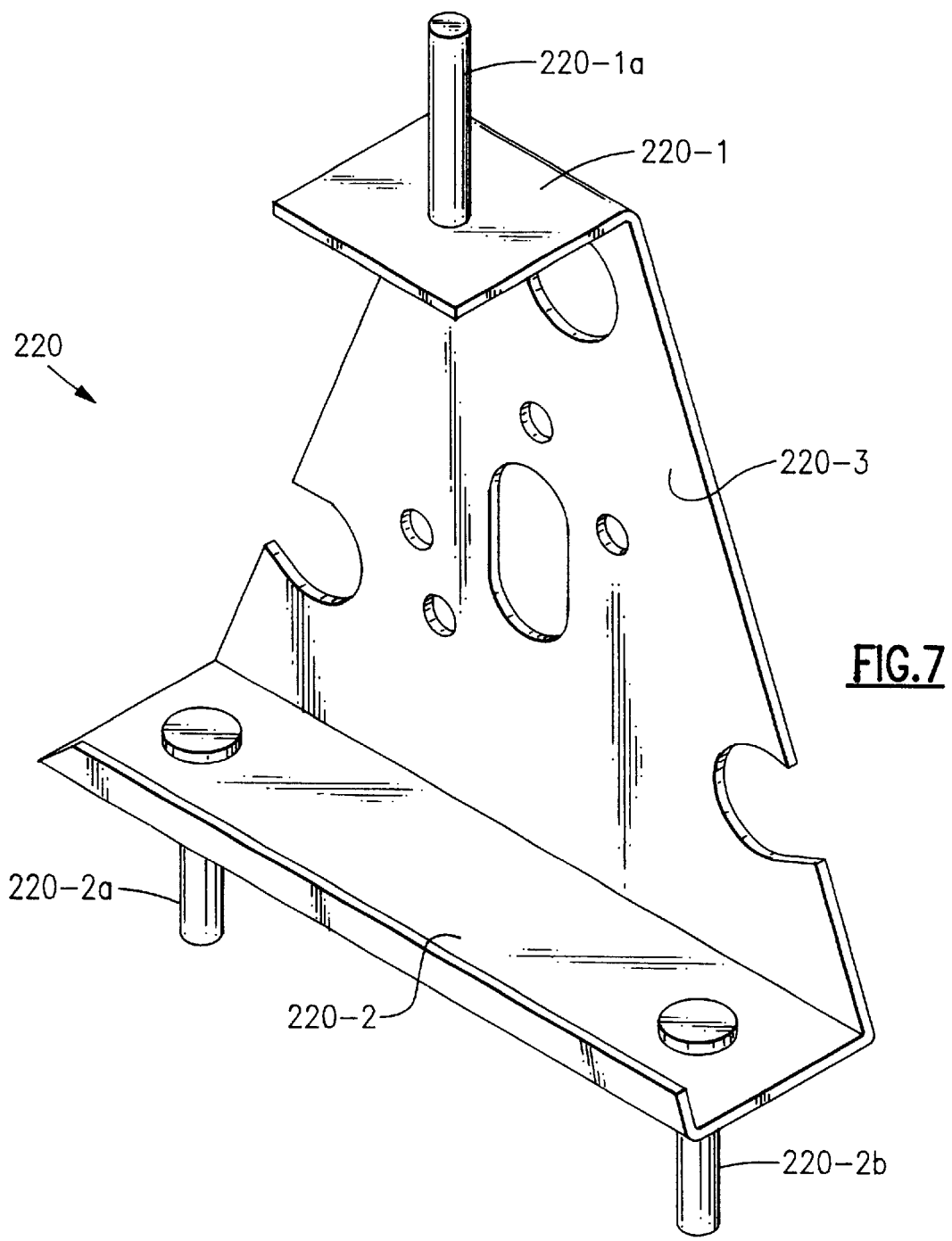
FIG. 7 is a pictorial view of a modified mounting plate.

Referring to FIG. 7, the numeral 220 generally designates the mounting plate. Mounting plate 220 is secured to base plate 210 and the motor 50, or the like, is secured to mounting plate 220. Normally the motor 50 will be attached to mounting plate 220 prior to mounting plate 220 being secured to base plate 210. In the preferred configuration for mounting a motor, motor plate 220 generally corresponds to a triangular piece of metal with a bend along one side, or base, of the triangle and with another bend at the spaced apex. If, as noted above, arms 210-1, 210-2 and 210-3 are in different planes, portion 220-2 would have to be divided into a plurality of portions and bent into planes parallel to planes corresponding to those defined by arms 210-2 and 210-3. The portion 220-1 corresponding to the bent apex portion and the portion 220-2 corresponding to the bent base portion are in spaced, parallel planes. The parallel planes defined by portions 220-1 and 220-2 are closer than the parallel planes defined by arm 210-1 and arms 210-2 and 210-3. The remaining portion, 220-3, of base plate 220 is of a trapezoid shape with cutouts and holes, as required, for assembly of another member, such as motor 50, thereto. Pins, or other suitable structure 220-1a, 220-2a and 220-2b are secured to portions 220-1 and 220-2 so as to extend outwardly therefrom in positions corresponding to the locations of perforate recesses 210-1a, 210-2a and 210-3a, respectively.

Figure 8:
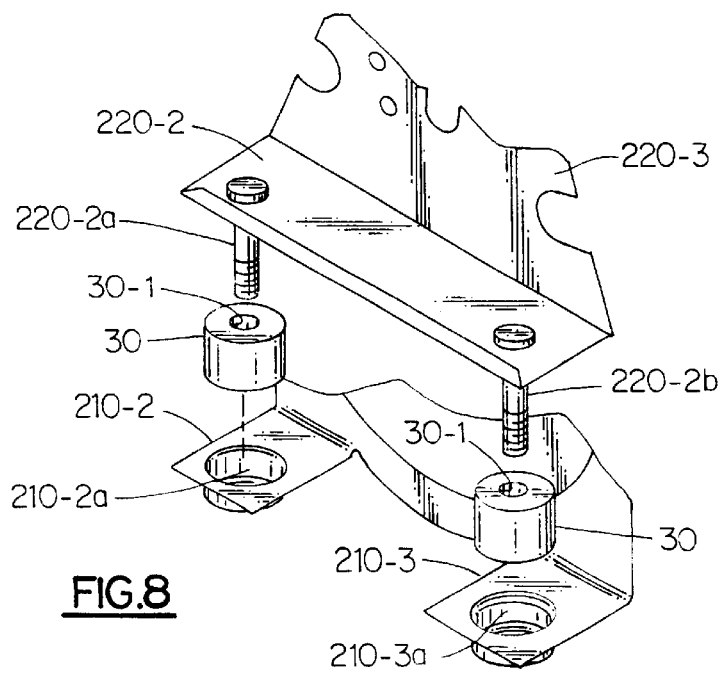
FIG. 8 is an exploded view of the lower isolation mounts for the base plate of FIG. 6 and the mounting plate of FIG. 7.
Figure 9:
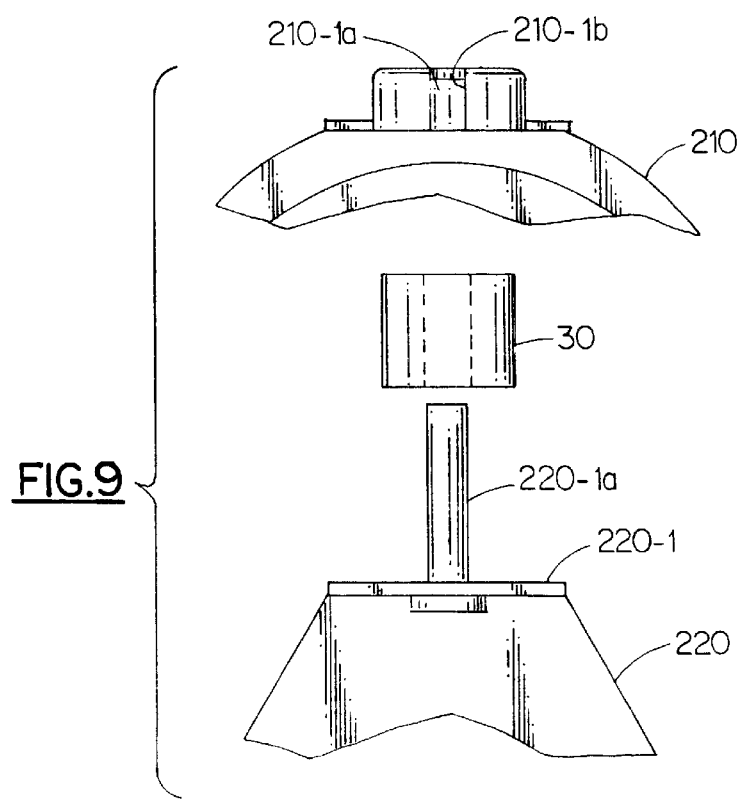
FIG. 9 is an exploded view of the upper isolation mounts for the base plate of FIG. 6 and the mounting plate of FIG. 7.
Figure 10:
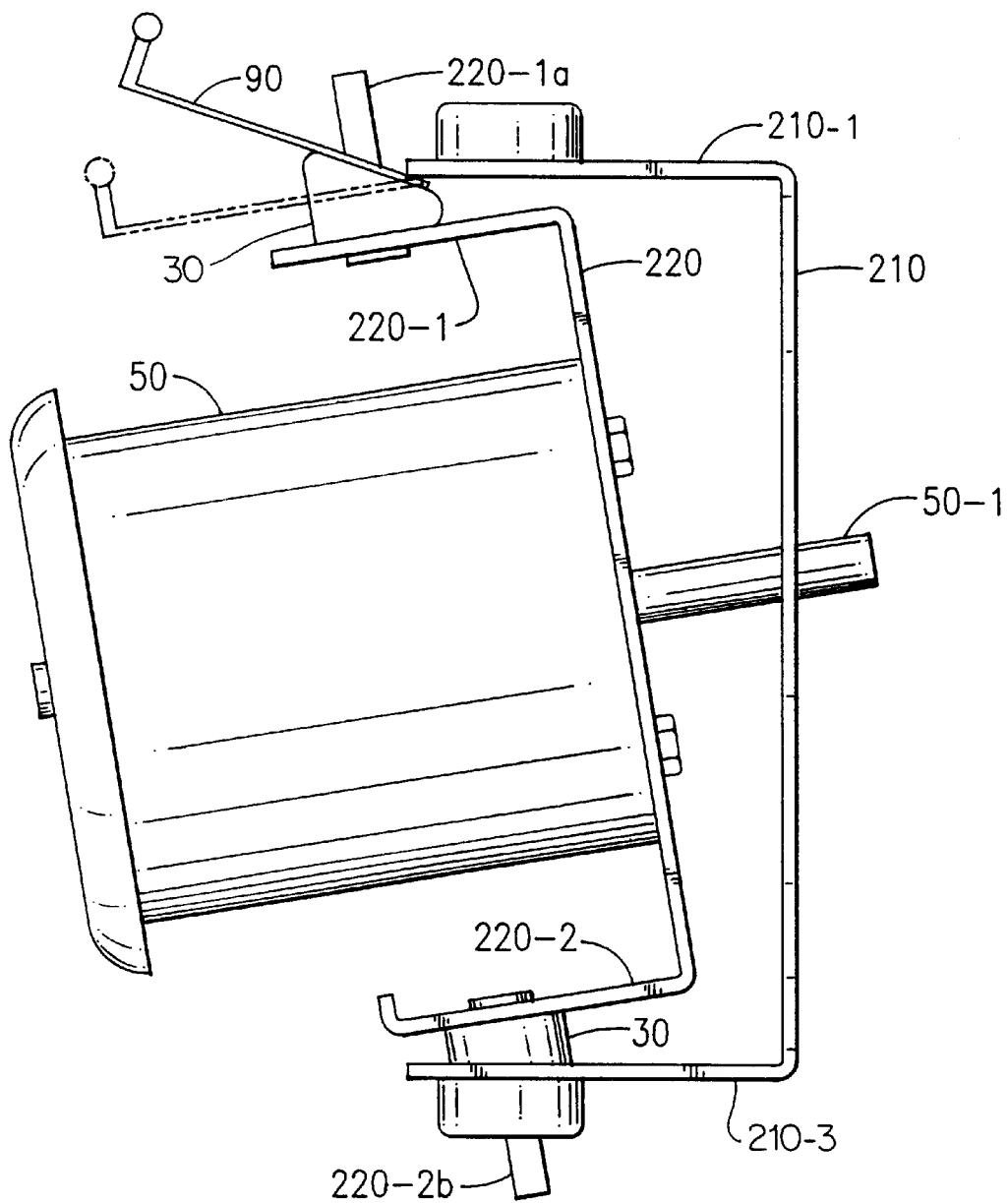
FIG. 10 is a view of a fan motor employing the structure of FIGS. 6–9 being assembled according to the teachings of the present invention.

The relative orientation of base plate 210 and mounting plate 220, during assembly, can be whatever is convenient. However, if bores 30-1 in isolation mountings 30 are sized to have a nominal interference fit with pins 220-1a, 220-2a and 220-2b, the isolation mountings 30 can be placed on pins 220-1a, 220-2a and 220-2b without their falling off as the members are manipulated. Similarly, if portions 210-4 and 220-3 are nominally horizontal, pins 220-1a, 220-2a and 220-2b will be horizontal and isolation mountings 30 will remain in place when placed thereon. If portion 210-4 is vertically oriented, isolation mountings may be placed in perforate recesses 210-2a and 210-3a and pins 220-2a and 220-2b, respectively, inserted therein. Referring specifically to FIG. 8, using one of the procedures described above, or any other suitable procedure, the exploded structure is assembled. Specifically, isolation mountings 30 are received in recesses 210-2a and 210-3a, to the full depth of the recesses, with pins 220-2a and 220-2b extending through bores 30-1 and the holes 210-2b and 210-3b in the recesses 210-2a and 210-3a, respectively, such that portion 220-2 engages the isolation mountings 30 located in recesses 210-2a and 210-3a and is separated from arms 210-2 and 210-3 only by the portion of isolation mountings 30 extending out of recesses 210-2a and 210-3a. Referring to FIG. 9, isolation mounting 30 is placed on pin 220-1a. At this point, pin 220-1a and the isolation mounting 30 located thereon extend beyond/above arm 210-1. To permit the isolation mounting 30 on pin 220-1a to be received in recess 210-1a, it is necessary to compress the isolation mountings 30 such that the isolation mounting 30 on pin 220-1a can pass beneath the arm 210-1 and the end of pin 220-1a extending beyond mounting 30 can pass through slot 210-1b into recess 210-1a. As best shown in FIG. 10, tool 90 could be used and it serves as a ramp relative to compressing the isolation mounting 30 on 220-1a and providing a slot to permit movement of pin 220-1a through slot 210-1b into recess 210-1a. As the isolation mounting 30 on pin 220-1a is compressed, the isolation mountings 30 on pins 220-2a and 220-2b will also be compressed since they are subject to the same forces in the same plane. To some degree there may be some resilient deformation of arm 210-1 relative to arms 210-2 and 210-3 to assist in permitting the isolation mount 30 to be received in recess 210-1a. Arm 210-1 will then be separated from portion 220-1 only by the portion of isolation mounting 30 extending from recess 210-1a.

Figure 11:
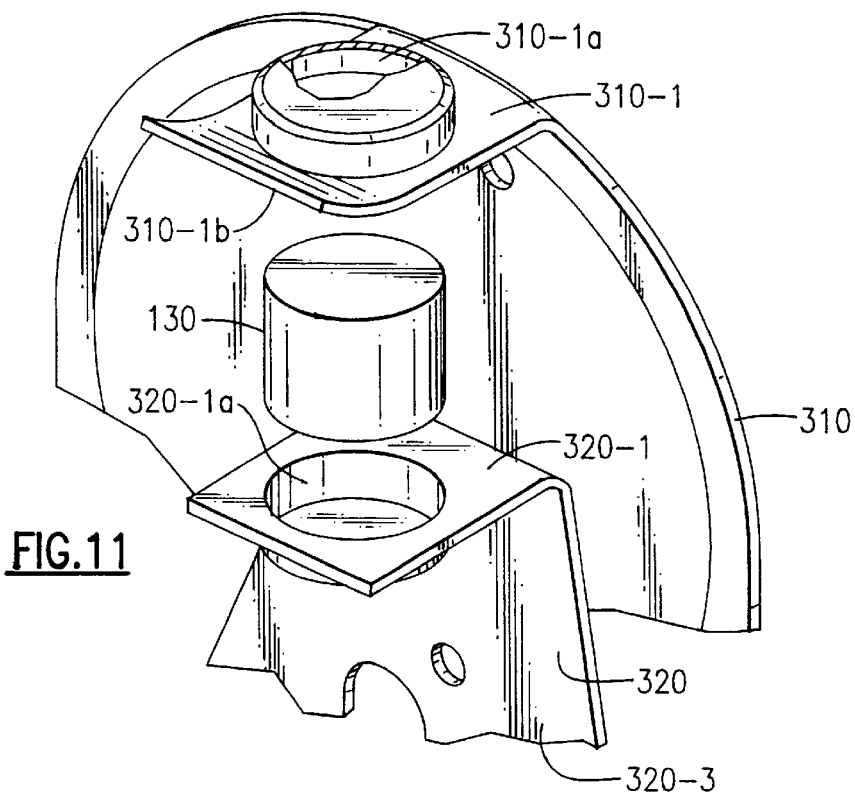
FIG. 11 is a partially cutaway exploded view of a modified upper isolation mounting structure.
Figure 12:
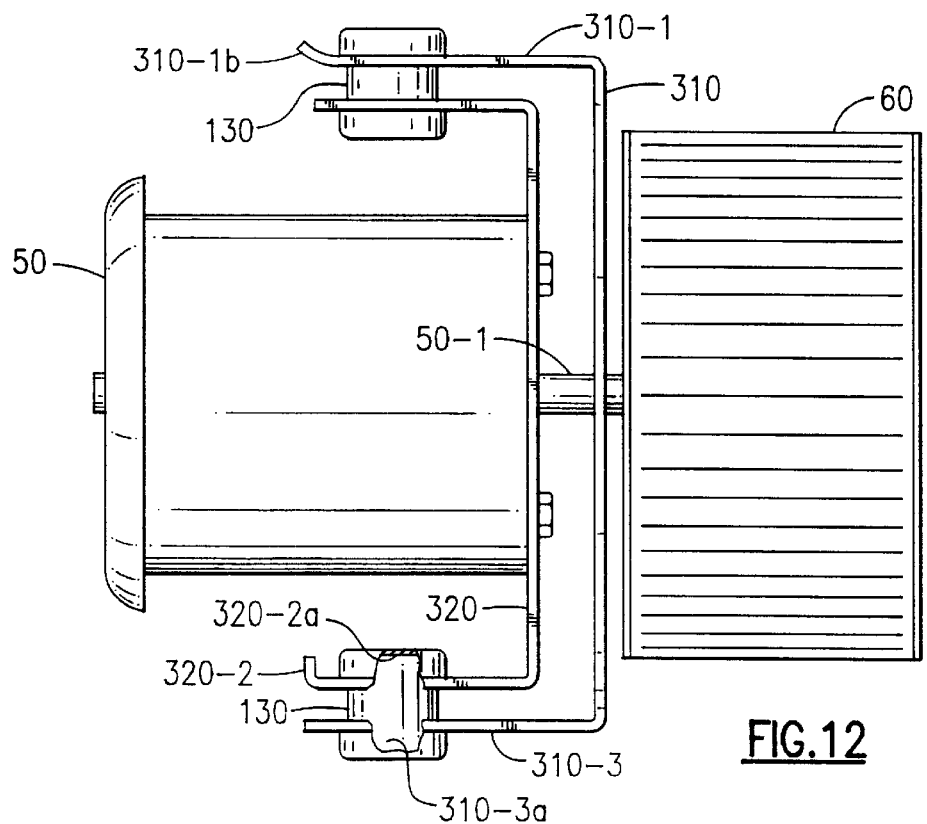
FIG. 12 is a partially cutaway view of a fan and motor mounted according to the teachings of the resent invention and employing the isolation mounting structure of FIG. 11.

FIGS. 11 and 12 correspond to FIGS. 3 and 4 and show modified isolation mounting structure. Isolation mountings 130 are cylindrical in shape and are of a suitable resilient material such as neoprene or rubber. Base plate 310 differs from plate 10 in three aspects. First, the recesses, as exemplified by recess 310-1a in arm 310-1, are oppositely located relative to recesses 10-1a, 10-2a and 10-3a, and recess 310-1a extends outwardly from arm 310-1 relative to arm 310-1 and plate 310. Second, the recesses, as exemplified by recess 310-1a do not have holes corresponding to hole 10-1b in recess 10-1a. Third, at least arm 310-1 is provided with a diverging lip 310-11b which serves as a ramp for guiding and compressing an isolation mounting 130 during assembly, as described below.

Mounting plate 320 differs from mounting plate 20 in two aspects. First a recess, as exemplified by recess 320-11a in arm 320-1, is provided and extends inwardly relative to arm 320-1 and plate 320. Second, the threaded holes exemplified by hole 20-1a have been eliminated.

The securing of mounting plate 320 to base plate 310 differs from the securing of mounting plate 20 to base plate 10 in that the isolation mountings 130 are the sole physical connection between mounting plate 320 and base plate 310. Basically, a plurality of isolation mountings 130 are circumferentially spaced and compressed between the mounting plate 320 and base plate 310. Assuming that base plate 310 and mounting plate 320 are identical to base plate 10 and mounting plate 20 except for the differences noted, assembly will be described as to the structure illustrated in FIGS. 11 and 12. Motor 50 will be secured to mounting plate 320. Isolation mountings 130 will be placed in the recesses in the lower arms exemplified by recess 310-3a in arm 310-3. Shaft 50-1 will be extended through suitable slots or openings in plate 310 and portion 320-3 of plate 320 as the recesses in portion 320-2, as exemplified by recess 320-2a, are made to receive, in a canted manner, the upper portions of the isolation mountings 130 received in the lower portion of base plate 310. Because recess 320-2a receives isolation mounting 130 in a canted fashion, recesses 320-1a and 310-1a are totally out of registration. An isolation mounting is placed in recess 320-1a and mounting plate 320 and attached motor 50 are pivoted in a clockwise direction, with reference to FIG. 12, with the isolation mountings 130 in portion 320-2 serving as pivots. As the mounting plate 320 and attached motor 50 are pivoted, recess 320-2a moves into registration with mounting 130 which is assisted by the resilience of isolation mounting 130 to accommodate its receipt in recess 320-2a. The pivoting of the mounting plate 320 and attached motor 50 also brings the isolation mounting 130 which is in recess 320-1a into contact with lip 310-1b.

Further, pivoting movement is only possible by compression of the isolation mountings 130. The isolation mountings 130 are nominally in the same plane at the time the compression forces will act on all of the isolation mountings 130. By manual pressure, through the use of a tool etc. the isolation mountings 130 in recess 320-1a is compressed sufficiently to engage the ramp formed by lip 310-1b. Further, pivoting movement further compresses the isolation mountings 130 until the isolation mounting 130 is recess 320-1a comes into registration with recess 310-1a thereby relieving some of the compressive forces acting on the isolation mountings 130. Impeller 60 will then be secured to shaft 50-1. The isolation mountings 130 which are below the motor 50 will support the weight of the motor 50 when it is horizontally oriented. When motor 50 is vertically oriented, all of the isolation mountings 130 will support the motor 50 against a tendency for shearing movement between plates 310 and 320 at the locations of isolation mountings 130.

Figure 13:
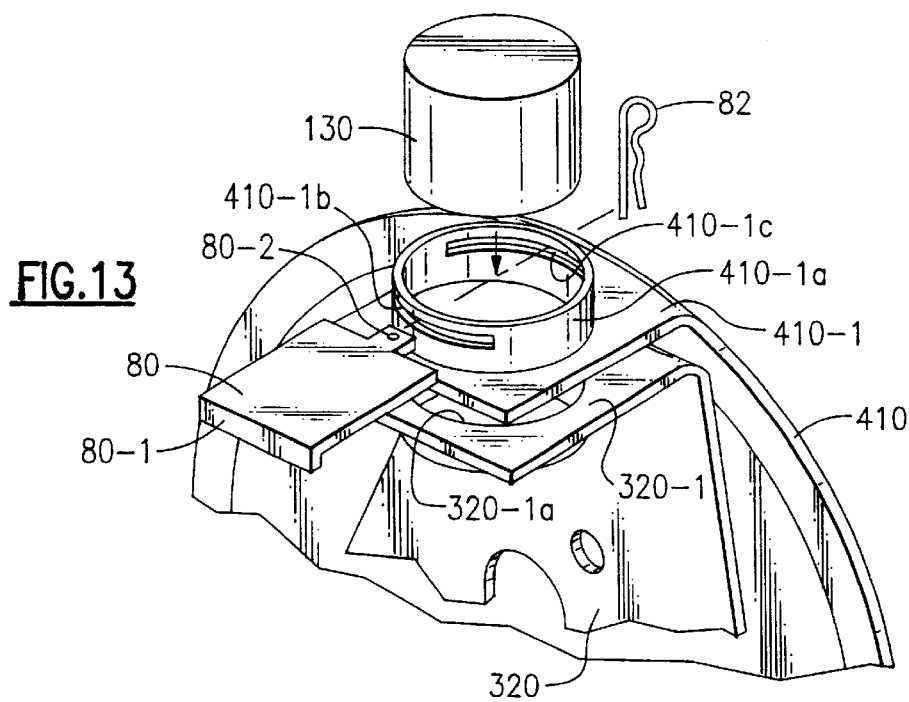
FIG. 13 is a partial exploded view of a modified upper isolation mounting structure.
Figure 14:
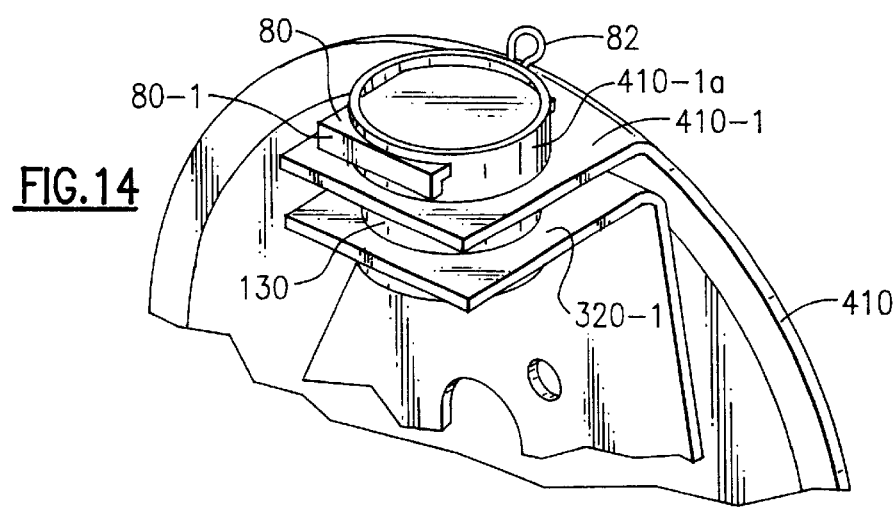
FIG. 14 corresponds to FIG. 13 but shows the structure assembled.
Figure 15:
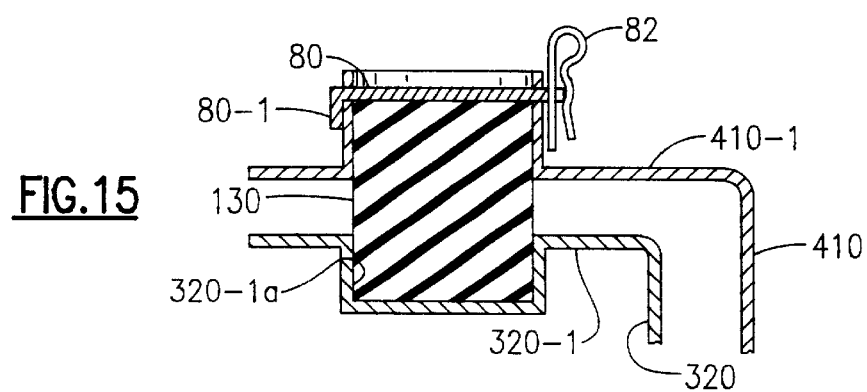
FIG. 15 is a sectional view of the FIG. 14 structure.

The modification of FIGS. 13–15 differs from that of FIGS. 11 and 12 in the details of arm 310-1. Arm 410-1 of base plate 410 differs from arm 310-1 in that a tubular or annular cylindrical portion 410-1a is formed rather than a recess such as 310-1a. However, retainer 80 coacts with annular cylindrical portion 410-1a to effectively form a recess. Additionally, two circumferentially extending, diametrically located slots 410-1b and 410-1c are provided at a location corresponding to isolation mounting 130 being compressed to the desired extent.

As is clear from FIG. 13, recess 320-1a and tubular or annular cylindrical portion 410-1a are aligned without isolation mounting 130 being in place which greatly facilitates assembly. With the other isolation mountings 130 in place and with annular cylindrical portion 410-1a aligned with recess 320-1a, an isolation mounting 130 is inserted into annular cylindrical portion 410-1a and then into recess 320-1a. Isolation mounting 130 is compressed and forced downwardly into recess 320-1a, as by a suitable tool (not illustrated) such that isolation mounting 130 clears slots 410-1b and 410-1c. With isolation mounting 130 so compressed, retainer 80 is inserted into slot 410-1b, moved across annular cylindrical portion 410-1a and through slot 410-1c. The isolation mounting 130 is then permitted to be relieved of its compression to the extent permitted by retainer 80. Retainer 80 is held in place due to the annular lip 80-1 on one side and pin 82 in hole 80-2 on the other side. The device of FIGS. 13–15 would function in the same manner as the embodiment of FIGS. 11 and 12.

The embodiments of FIGS. 16–22 eliminate mounting plates 20, 220 and 320 as separate structure and, instead, incorporate the corresponding structure into the shell 50-a of motor 50 or attaches it thereto. Shell 50-a is generally cylindrical such that its outer surface is equally spaced from axis A—A. The end 50-b of the shell, 50-a, corresponds to portion 20-3 of mounting plate 20, 220-3 of mounting plate 220, and 320-3 of mounting plate 320. Axis A—A is perpendicular to end 50-b. Portions of shell 50-a correspond to the locations of the isolation mounting securing or attaching structure of mounting plates 20, 220 and 320, modified for the radial positioning of the isolation mountings, are provided with structure for securing or attaching the isolation mounting structure. These portions of shell 50-a provide locations that are generally perpendicular to the end 50-b. This provides several advantages in that the mounting plate is eliminated, there are fewer parts to assemble, and a more compact assembly is possible.

Figure 16:
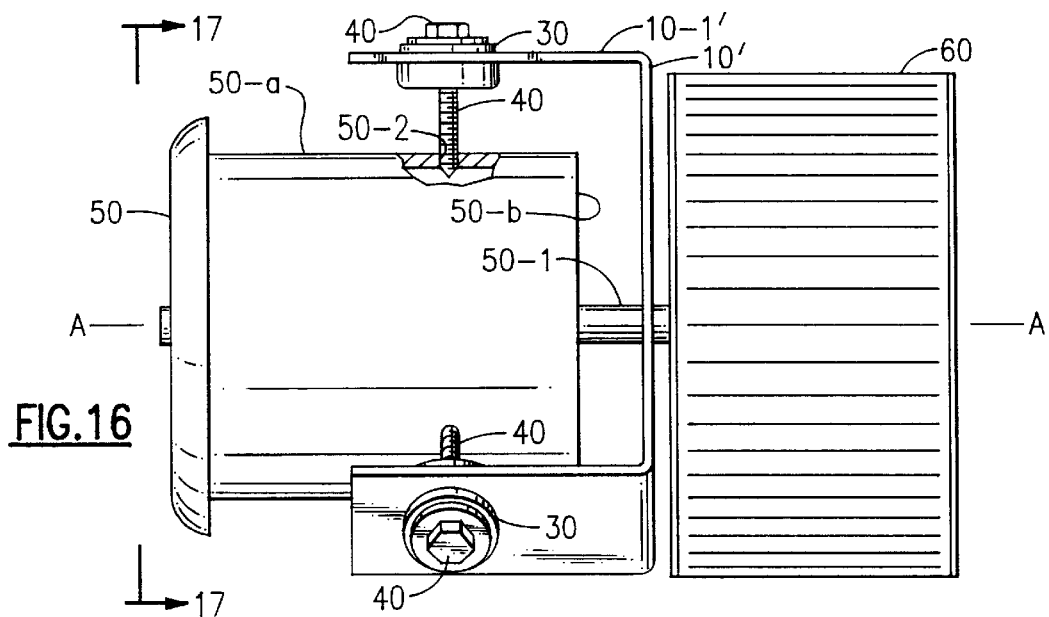
FIG. 16 is partially sectioned view of a fan and a motor mounted without the use of a base plate.
Figure 17:
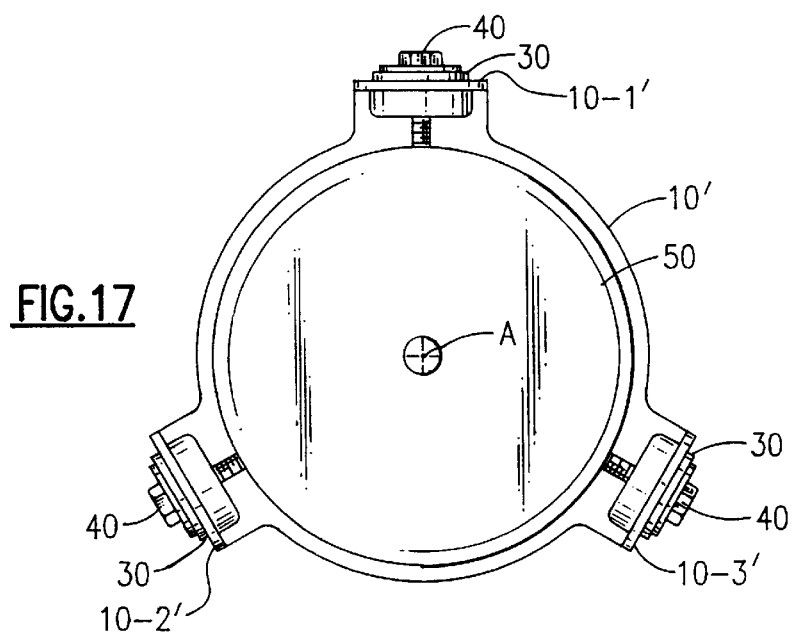
FIG. 17 is an view of the embodiment of FIG. 16.

Referring to the embodiment of FIGS. 16 and 17, it generally corresponds to the embodiment of FIGS. 1 to 4. There are three changes. First, mounting plate 20 has been eliminated. Second, circumferentially spaced radially extending threaded holes exemplified by hole 50-2 have been provided in the shell 50-a of motor 50. Third, base plate 10 has been modified to base plate 10' to accommodate the fact that all of the screws 40, and therefore isolation mountings 30, are radially located relative to shell 50-a. The arms of base plate 10', 10-1', 10-2' and 10-3', are in different planes and, preferably, generally equally circumferentially spaced. Except for securing the screws 40 directly to shell 50-a, the assembly and operation of the FIGS. 16 and 17 embodiment could be the same as that of the FIG. 4 embodiment.

Figure 18:
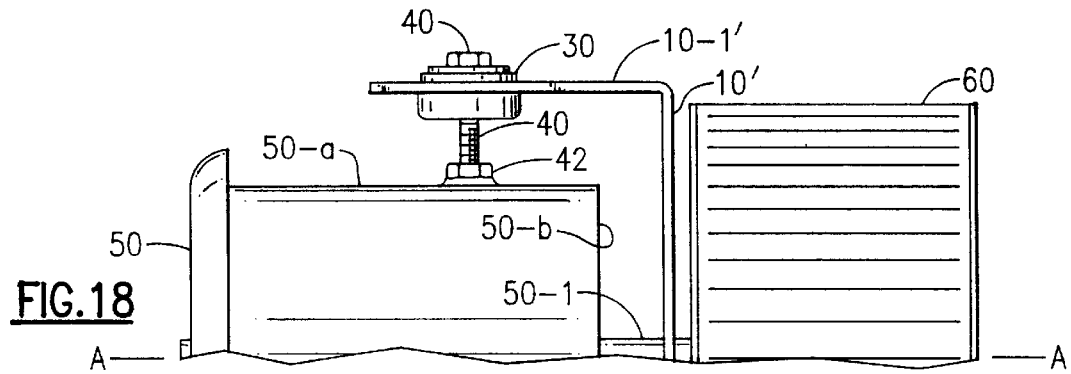
FIG. 18 is a partial view of a modified isolation mounting structure.

The embodiment of FIG. 18 is the same as that of FIGS. 16 and 17 except that the threaded holes exemplified by hole 50-2 have been replaced by nuts 42 or other suitable fasteners welded or otherwise suitably secured to shell 50-a in a circumferentially spaced, radially extending manner.

Figure 19:
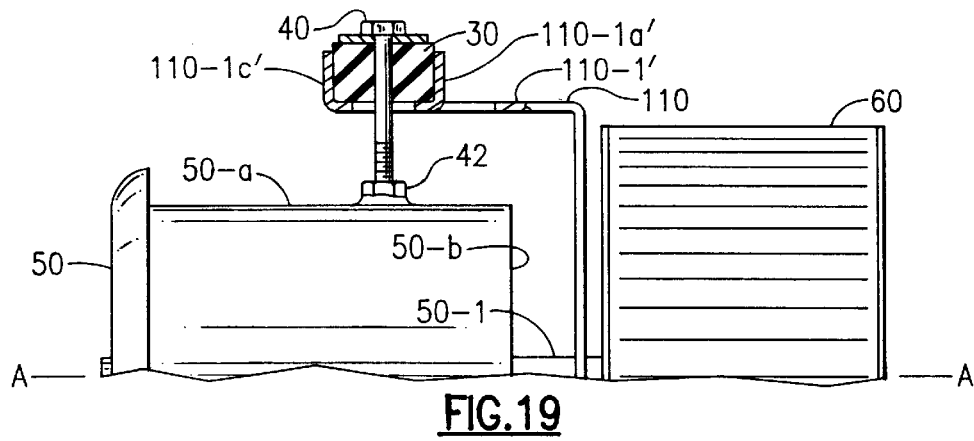
FIG. 19 is a partial, partially cutaway view of a modified isolation structure.

The embodiment of FIG. 19 generally corresponds to the embodiment of FIG. 5. Accordingly, the embodiment of FIG. 19 differs from that of FIG. 18 in that isolation mountings 30 are received in a recesses formed by tabs formed in the arms of base plate 110'. Specifically, as exemplified by arm 110-1' of base plate 110', a plurality of tabs are formed in an 110-1' and bent outwardly so as to collectively form structure for retaining isolation mounting 30 in place in the equivalent manner as recesses 10-1a, 10-2a and 10-3a. As illustrated in FIG. 19 tabs 110-1c' and 110-1a' correspond to tabs 110-1c and 110-1a of FIG. 5. The assembly and operation of the FIG. 19 embodiment would be the same as that of the embodiment of FIG. 18.

Figure 20:
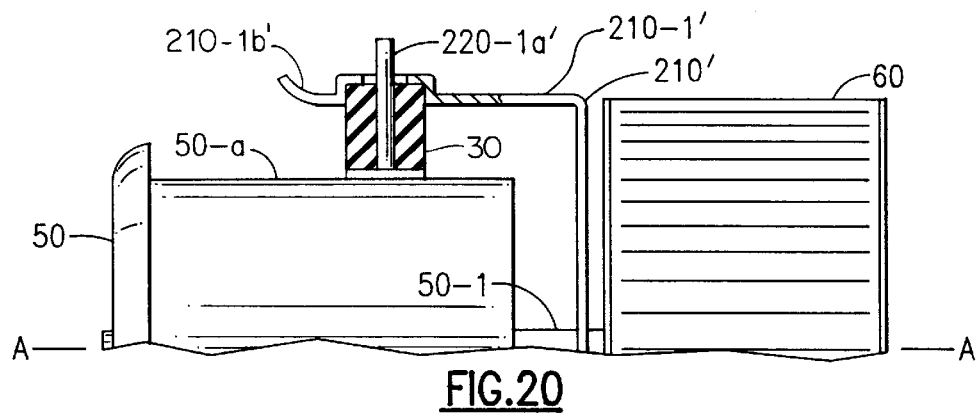
FIG. 20 is a partial, partially cutaway view of a modified isolation structure.

The embodiment of FIG. 20 generally corresponds to the embodiment of FIGS. 6–10. There are three changes. First mounting plate 220 has been eliminated. Second, circumferentially spaced, radially extending pins exemplified by pin 220-1a' are welded or otherwise suitably secured to shell 50-a of motor 50. Third base plate 210 has been modified to base plate 210' to accommodate the fact that all of the pins exemplified by pin 220-1a, and therefore isolation mountings 30 are radially located relative to shell 50-a. The arms of base plate 210', of which arm 210-1' is illustrated, are in different planes and, preferably, generally equally circumferentially spaced. Arm 210-1' has a slot 210-1b' corresponding to slot 210-1b. Except for the pins exemplified by pin 220-1a' being secured to shell 50-a, the assembly and operation of the FIG. 20 embodiment would be the same as that of FIGS. 6–10.

Figure 21:
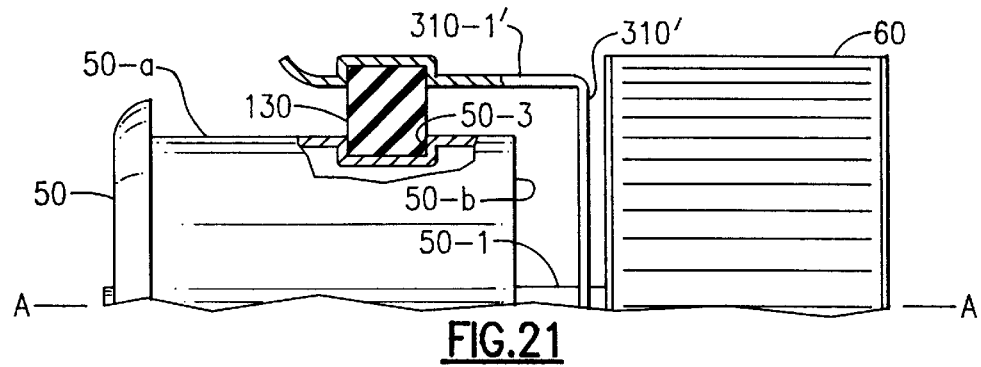
FIG. 21 is a partial, partially cutaway view of a modified isolation structure.

The embodiment of FIG. 21 generally corresponds to the embodiment of FIGS. 11 and 12. There are three changes. First mounting plate 320 has been eliminated.

Second, circumferentially spaced, radially extending recesses, exemplified by recess 50-3, are formed in shell 50-a and correspond to recesses 320-1a and 320-3a of FIGS. 11 and 12, respectively. Third, base plate 310 has been modified to base plate 310' to accommodate the fact that all of the recesses exemplified by recess 50-3, and therefore isolation mountings 130 are radially located relative to shell 50-a. The arms of base plate 310', of which arm 310-1' is illustrated, are in different planes and, preferably, generally equally circumferentially spaced. Except for the mounting plate 320 being eliminated and the recesses exemplified by recess 50-3 formed in shell 50-a, the assembly and operation of the FIG. 21 embodiment would be same as that of the embodiment of FIGS. 11 and 12.

Figure 22:
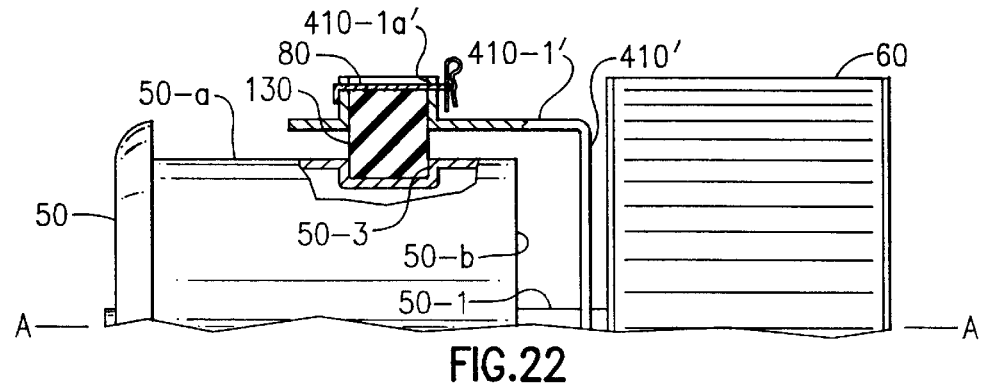
FIG. 22 is a partial, partially cutaway view of a modified isolation structure.

The embodiment of FIG. 22 generally corresponds to the embodiment of FIGS. 13–15 and differs from the embodiment of FIG. 21 for the same reasons that the embodiment of FIGS. 13–15 differs from that of FIGS. 11 and 12. The arms of base plate 410', of which arm 410-1' is illustrated, are in different planes to accommodate circumferentially spaced, radially extending isolation mountings 130. Only arm 410-1' will have an open tubular or annular cylindrical portion 410-1a' rather than a recess such as 310-1a. Retainer 80 coacts with annular cylindrical portion 410-1a' to effectively form a recess, as in the case of the embodiment of FIGS. 13–15. The assembly and operation of the FIG. 22 embodiment would be essentially the same as that of the embodiment of FIGS. 13–15.

Although preferred embodiments of the present invention have been illustrated and described, other modifications will occur to those skilled in the art. For example, if necessary, or desired, the cross sections and/or materials of the isolation mountings may be varied to change their response. It is therefore intended that the present invention is to be limited only by the scope of the appended claims.

What is claimed is:

1. Isolation mounting structure including an integral load comprising:

a first member having a first portion, a second portion located in a plane generally perpendicular to said first portion and a third portion located in a plane generally perpendicular to said first portion of said first member and peripherally spaced from said second portion of said first member;

said load being integral with said first member and extending in a direction from said first portion of said first member to a point beyond said second and third portions of said first member which defines a free end of said load having an axis generally parallel to said second and third portions of said first member;

a second member having a first portion, a second portion generally perpendicular to said first portion of said second member and a third portion generally perpendicular to said first portion of said second member and peripherally spaced from said second portion of said second member with said second and third portions of said second member being further spaced from each other than said second and third portions of said first member are spaced from each other;

said second and third portions of said second member being spaced from and generally parallel to said second and third portions, respectively, of said first member;

said second and third portions of said second member defining recesses;

a plurality of isolation mounts having two ends with one of said ends being received in respective ones of said recesses;

means coacting with respective ones of said isolation mounts and respective ones of said second and third portions of said first member for holding said isolation mounts in compression in said recesses and for securing said first member to said second member such that all contact between said first and second members is through said isolation mounts and said free end of said load is cantilevered with respect to said isolation mounts when said axis is horizontal and overhung or when said axis is vertical.

2. The isolation mounting structure of claim 1 wherein:

said isolation mounts have bores therein and holes are formed in said recesses;

said means for holding and securing includes attachment structure associated with said second and third portions of said first member and threaded members respectively engaging the other ones of said two ends of said isolation mounts and extending serially through said bores in said isolation mounts, said holes in said recesses and threadably engaging said attachment structure w hereby said first member is secured to said second member.

3. The isolation mounting structure of claim 2 wherein said first member is a shell of a motor.

4. The isolation mounting structure of claim 2 where in said recesses are formed be bending tabs formed on said second and third portions of said second member.

5. The isolation mounting structure of claim 1 further including:

a fourth portion on said second member generally perpendicular to said first portion of said second member and peripherally spaced from said second and third portions of said second member;

said fourth portion defining a recess which receives said one end of one of said isolation mounts.

6. The isolation mounting structure of claim 5 wherein said first member is a shell of a motor.

7. The isolation mounting structure of claim 1 wherein:
said isolation mounts have bores therein and holes are formed in said recesses;
said means for holding and securing includes a plurality of pins extending outwardly from said second and third portions of said first member;
each pin serially passing through the bore in a corresponding one of said isolation mounts and a corresponding hole in one of said recesses such that corresponding other ones of said two ends of said isolation mounts are compressively engaged by corresponding ones of said second and third portions of said first member.

8. The isolation mounting structure of claim 7 wherein said first member is a shell of a motor.

9. The isolation mounting structure of claim 7 wherein:
at least one of said second and third portions of said second member defining recesses further defines a slot communicating with a corresponding recess and thereby permitting lateral movement of a corresponding pin into the corresponding recess.

10. The isolation mounting structure of claim 1 wherein said means for holding and securing includes recesses in said second and third portions of said first member facing said recesses in said second and third portions of said second member and receiving a corresponding other one of said two ends of said isolation mounts which are thereby compressively engaged.

11. The isolation mounting structure of claim 10 wherein said first member is a shell of a motor.

12. The isolation mounting structure of claim 1 wherein said means for holding and securing includes recesses in said second and third portions of said first member facing said recesses in said second and third portions of said second member and receiving a corresponding other one of said two ends of said isolation mounts which are thereby compressively engaged with one of said recesses in said second member being defined in part by a removable retainer member which coacts with a corresponding isolation mount to maintain compression thereof.

13. The isolation mounting structure of claim 12 wherein said first member is a shell of a motor.

14. The isolation mounting structure of claim 1 wherein all of said plurality of isolation mounts are in a plane generally perpendicular to said axis.

15. Isolation mounting structure including an integral load comprising:
a first member having a first portion, a second portion generally perpendicular to said first portion and a third portion generally perpendicular to said first portion of said first member and peripherally spaced from said second portion of said first member;
said load being integral with said first member and extending in a direction from said first portion of said first member to a point beyond said second and third portions of said first member which defines a free end of said load having an axis generally parallel to said second and third portions of said first member;
a second member having a first portion, a second portion generally perpendicular to said first portion of said second member and a third portion generally perpendicular to said first portion of said second member and peripherally spaced from said second portion of said second member with said second and third portions of said second member being further spaced from each other than said second and third portions of said first member are spaced from each other;
said second and third portions of said second member being spaced from and generally parallel to said second and third portions, respectively, of said first member;
said second and third portions of said second member defining recesses;
a plurality of isolation mounts having two ends with one of said ends being received in respective ones of said recesses;
means coacting with respective ones of said isolation mounts and respective ones of said second and third portions of said first member for holding said isolation mounts in compression in said recesses and for securing said first member to said second member such that all contact between said first and second members is through said isolation mounts and said free end of said load is cantilevered with respect to said isolation mounts.

16. The isolation mounting structure of claim 15 wherein:
said isolation mounts have bores therein and holes are formed in said recesses;
said means for holding and securing includes attachment structure associated with said second and third portions of said first member and threaded members respectively engaging the other ones of said two ends of said isolation mounts and extending serially through said bores in said isolation mounts, said holes in said recesses and threadably engaging said attachment structure whereby said first member is secured to said second member.

17. The isolation mounting structure of claim 15 further including:
a fourth portion on said second member generally perpendicular to said first portion of said second member and peripherally spaced from said second and third portions of said second member;
said fourth portion defining a recess which receives said one end of one of said isolation mounts.

18. The isolation mounting structure of claim 15 wherein:
said isolation mounts have bores therein and holes are formed in said recesses;
said means for holding and securing includes a plurality of pins extending outwardly from said second and third portions of said first member;
each pin serially passing through the bore in a corresponding one of said isolation mounts and a corresponding hole in one of said recesses such that corresponding other ones of said two ends of said isolation mounts are compressively engaged by corresponding ones of said second and third portions of said first member.

19. The isolation mounting structure of claim 15 wherein said means for holding and securing includes recesses in said second and third portions of said first member facing said recesses in said second and third portions of said second member and receiving a corresponding other one of said two ends of said isolation mounts which are thereby compressively engaged.

20. The isolation mounting structure of claim 15 wherein said means for holding and securing includes recesses in said second and third portions of said first member facing said recesses in said second and third portions of said second member and receiving a corresponding other one of said two ends of said isolation mounts which are thereby compressively engaged with one of said recesses in said second member being defined in part by a removable retainer member which coacts with a corresponding isolation mount to maintain compression thereof.

* * * * *